March 21, 1967 H. W. MALM ETAL 3,310,294
AGITATOR FOR DUMP BODIES USED IN TRANSPORTING CONCRETE
Filed July 30, 1965 4 Sheets-Sheet 1

Inventors
Harry W. Malm
Dorit M. Clendening

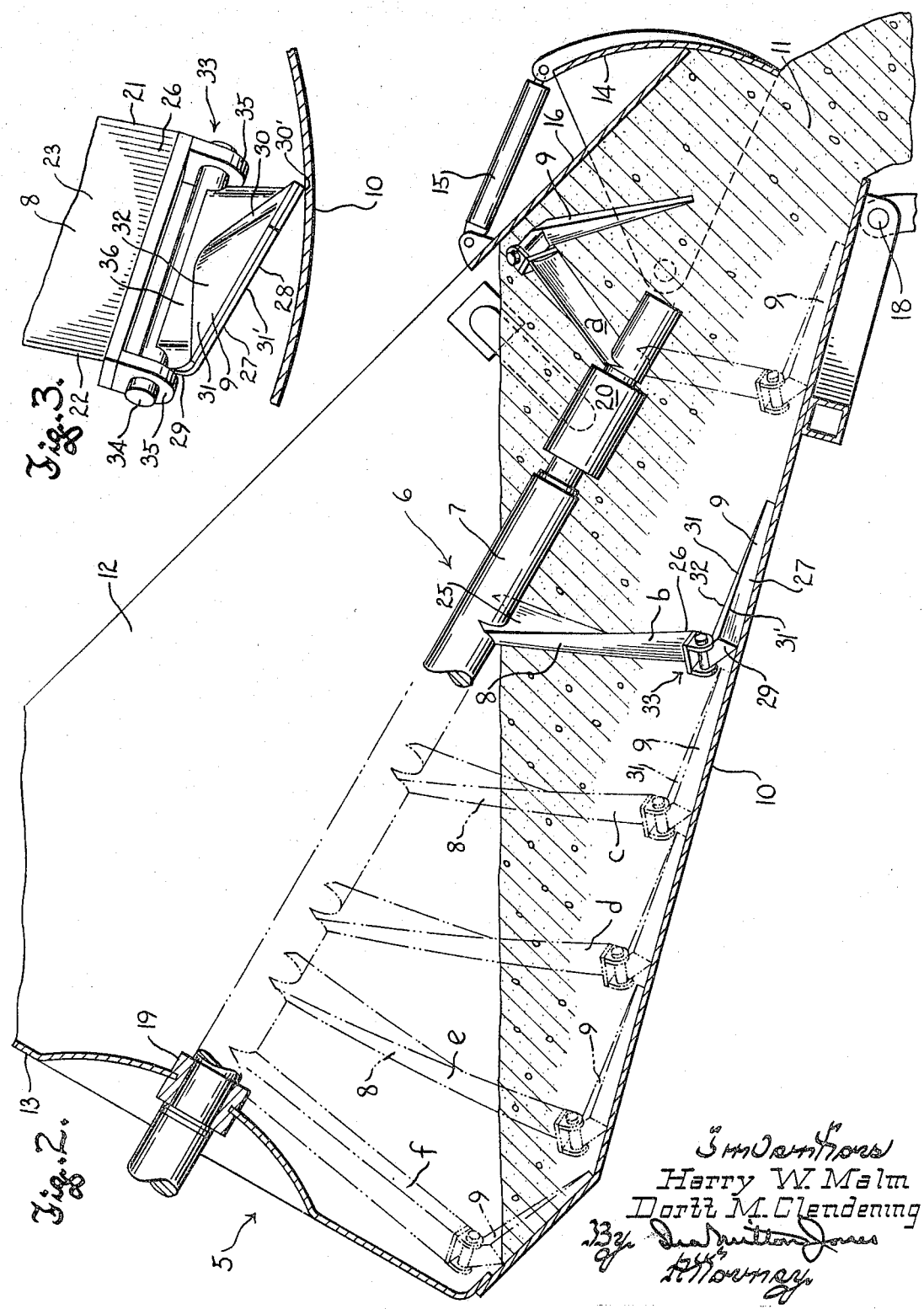

March 21, 1967  H. W. MALM ETAL  3,310,294
AGITATOR FOR DUMP BODIES USED IN TRANSPORTING CONCRETE
Filed July 30, 1965  4 Sheets-Sheet 3
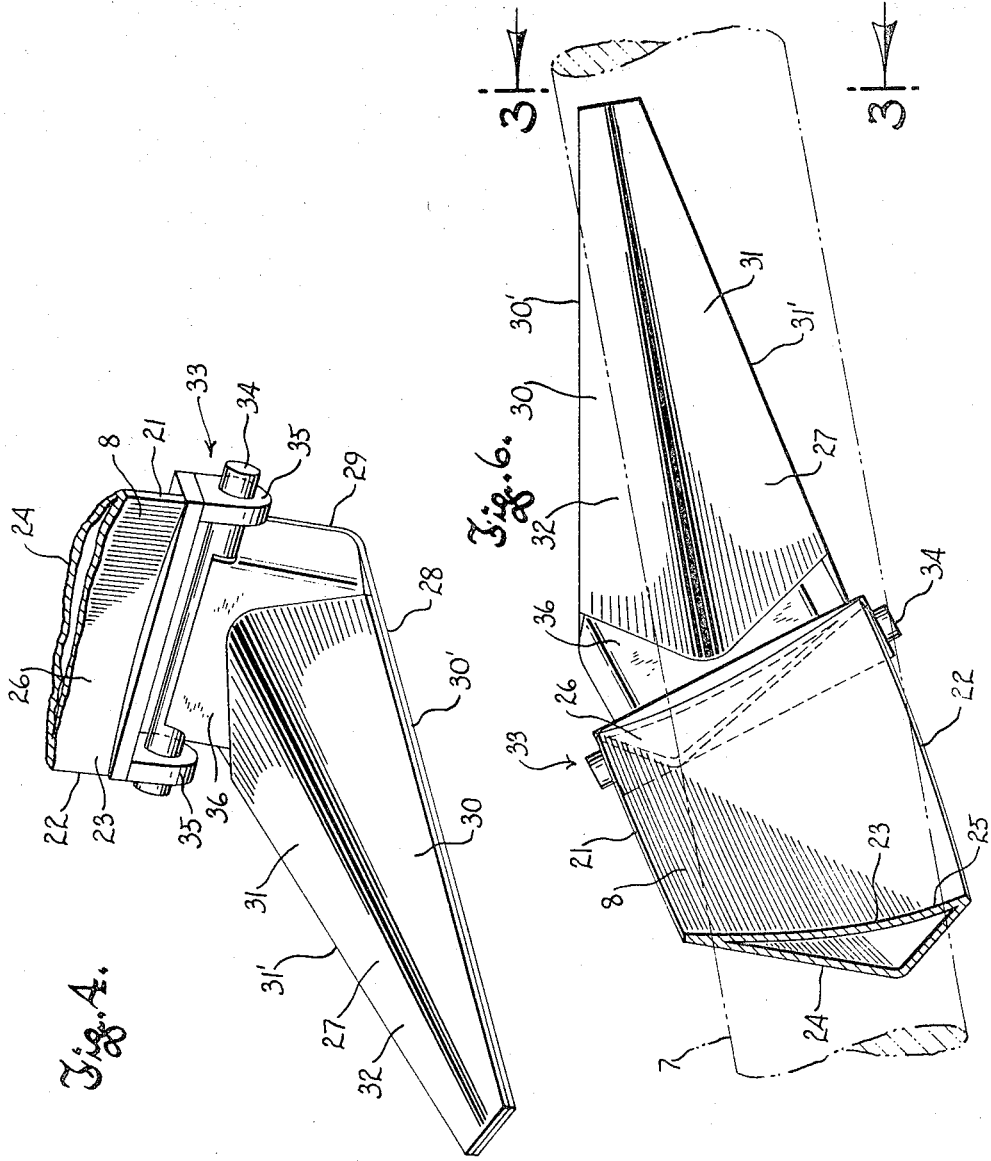
Inventors
Harry W. Malm
Dortt M. Clendening
By
Attorney

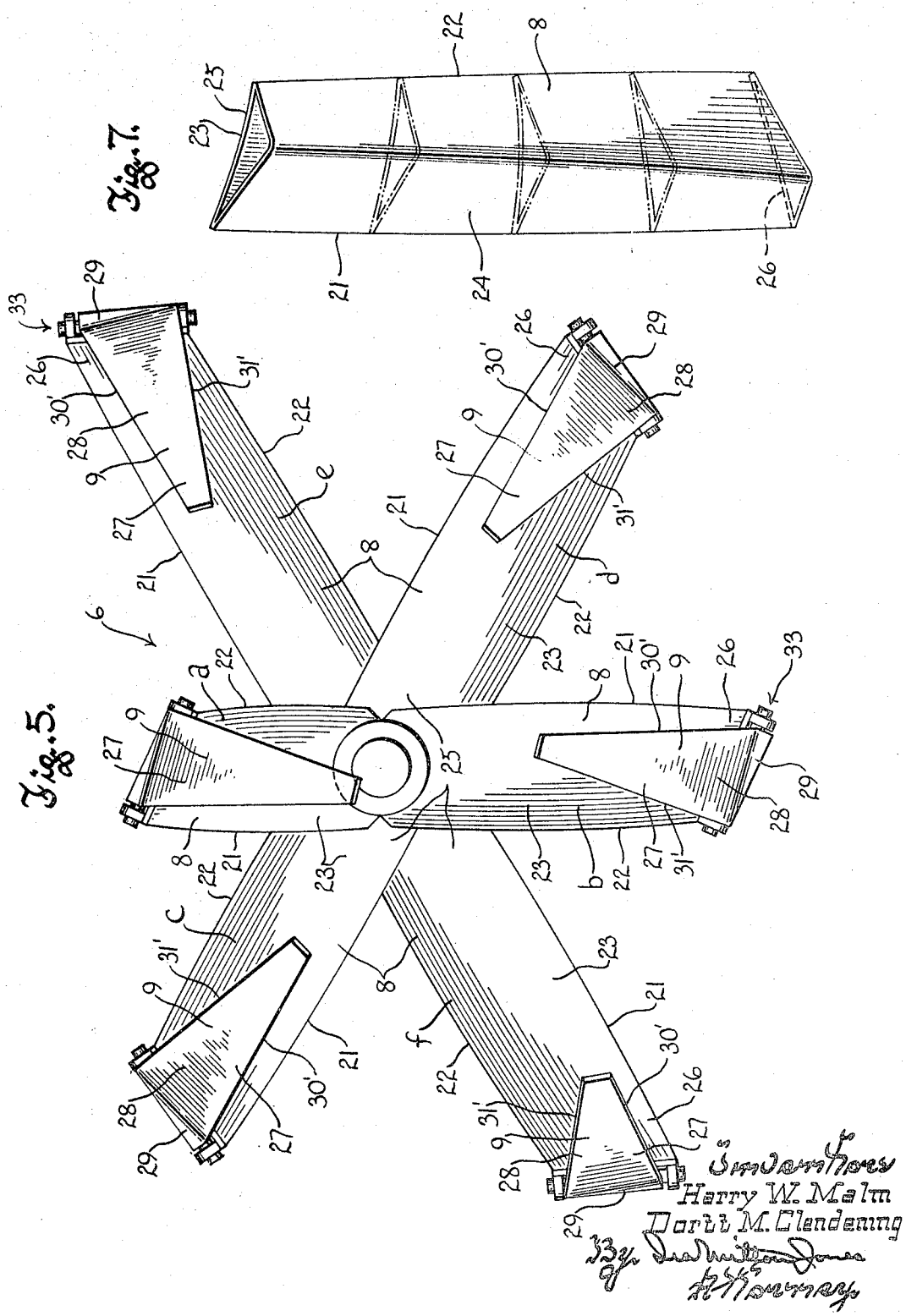

United States Patent Office 3,310,294
Patented Mar. 21, 1967

3,310,294
AGITATOR FOR DUMP BODIES USED IN
TRANSPORTING CONCRETE
Harry W. Malm and Dortt M. Clendening, Brown Deer, Wis., assignors to S. and M. Manufacturing Co., Milwaukee, Wis., a corporation of Wisconsin
Filed July 30, 1965, Ser. No. 476,038
8 Claims. (Cl. 259—178)

This invention relates to agitators for mixing and agitating viscous materials such as fresh concrete, and the invention pertains more particularly to an agitator which is especially well adapted for incorporation in a vehicle dump body.

In the construction of dams, and in highway and airport paving projects, concrete is ordinarily mixed at a central batching and mixing plant and is transported to the site of use in dump body vehicles. One objective always sought on any such project is to pour the greatest possible amount of concrete per working day, and the operations of the central plant and the dump body vehicles are coordinated to that end.

Heretofore the capacity and cycle time of the central batching and mixing plant have determined the rate at which concrete could be poured. By having a sufficiently large fleet of dump body vehicles available, and scheduling them to arrive at the central plant at intervals corresponding to its mixing cycle, the contractor could operate the central plant at its full normal capacity.

Since the central plant is one of the most expensive pieces of equipment on a large concrete project, if not the most expensive, any expedient that will decrease its cycle time and thereby increase its hourly capacity will increase the contractor's return on invested capital as well as improving his performance on the project. With this in mind, it is a general object of the present invention to provide an agitator for vehicle dump bodies that is capable of effectively mixing concrete, so that a dump body equipped with the agitator of this invention can be charged at a central batching plant with a load of concrete that is only partially mixed and can complete the mixing of the concrete while transporting it to the pouring site. Obviously the attainment of this objective effects a proportionate reduction in the amount of time that must be spent by the central plant in mixing each load of concrete, and thereby increases the daily output of the plant in proportion to the decrease in its cycle time.

Of course agitators for vehicle dump bodies are in themselves well known, one example of such an agitator being disclosed in Patent No. 3,133,728, issued May 19, 1964, to H. C. Janke. But prior dump body agitators were mainly intended for maintaining concrete in substantially homogeneous condition during transport by preventing settling of the heavier aggregates. They were not very effective for actual mixing. For actual mixing in transit, the only satisfactory equipment heretofore available was a vehicle mounted drum type mixer, but this had a capacity so much smaller than that of the dump body as to be impractical for large projects, and had the further disadvantage that it discharged its contents too slowly for use on paving projects, dam construction jobs and the like.

Hence it can be said to be another object of this invention to provide a very versatile vehicle body for transporting concrete, combining the carrying capacity and high discharge rate of dump bodies with a mixing ability which approaches that of the drum type mixer, and which vehicle body is therefore satisfactory for use in transporting sand, gravel, earth and the like as well as for simultaneously transporting and mixing concrete.

Another object of the present invention is to provide an agitator for vehicle dump bodies which produces a very effective mixing action when operated in one direction of rotation and which, when operated in the opposite direction, wipes the wall of the body in which it is mounted and propels the body contents toward the discharge end of the body in order to insure fast, clean dumping of concrete and similar viscous materials.

Another and more specific object of this invention is to provide a mixing agitator for a vehicle dump body, which agitator comprises a shaft that extends through the body and one or more arm-like blade elements that are fixed to the shaft and project radially therefrom, wherein each blade element has its root portion pitched in one direction and its tip portion pitched in the opposite direction, as by having the blade element twisted along its length, so as to produce a more or less toroidal circulation of concrete or other material in which it works whereby very efficient mixing action is achieved.

A further specific object of this invention is to provide an agitator for dump bodies of the character described having a rotatable shaft from which one or more fixed arm-like blade elements project substantially radially and having a movable blade element hingedly connected to the outer end of each fixed blade element for swinging motion between a mixing position, in which the movable blade element effects turbulent agitation of material in the body, and a discharge position in which the movable blade element has wiping contact with the body wall and propels material in the body toward the discharge end thereof, such swinging motion of the movable blade element being produced by reaction of the movable blade element to material in the body in consequence of rotation of the shaft in one direction or the other, the position assumed by the movable blade element being dependent upon the direction of shaft rotation.

It is also an object of this invention to provide an agitator of the character described that is adaptable to existing vehicle dump bodies as a replacement for prior agitators without requiring any modification of the body.

An additional object of this invention is to provide an agitator for vehicle dump bodies that is particularly well suited for use with low slump (very viscous) concrete, and which features the ability to achieve complete and very rapid but smooth discharge of such material from the body.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

FIGURE 2 is a view similar to FIGURE 1 but showing the body in its dumping position and the movable blade elements in their wiping or discharging positions;

FIGURE 3 is a fragmentary sectional view on a larger scale, taken on the plane of the line 3—3 in FIGURE 6, and showing the tip portion of one of the fixed blade elements of the agitator of this invention and the movable blade element connected thereto, the latter being shown as viewed from near its free end and in wiping relation to a portion of a dump body wall which is shown in section;

FIGURE 4 is a fragmentary side perspective view of one of the movable blade elements of the agitator of this invention and the tip portion of the fixed blade element to which it is hingedly connected;

FIGURE 5 is a view of the agitator of this invention as seen from the discharge end of the body with the movable blade elements of the agitator shown in their mixing positions;

Figure 1:
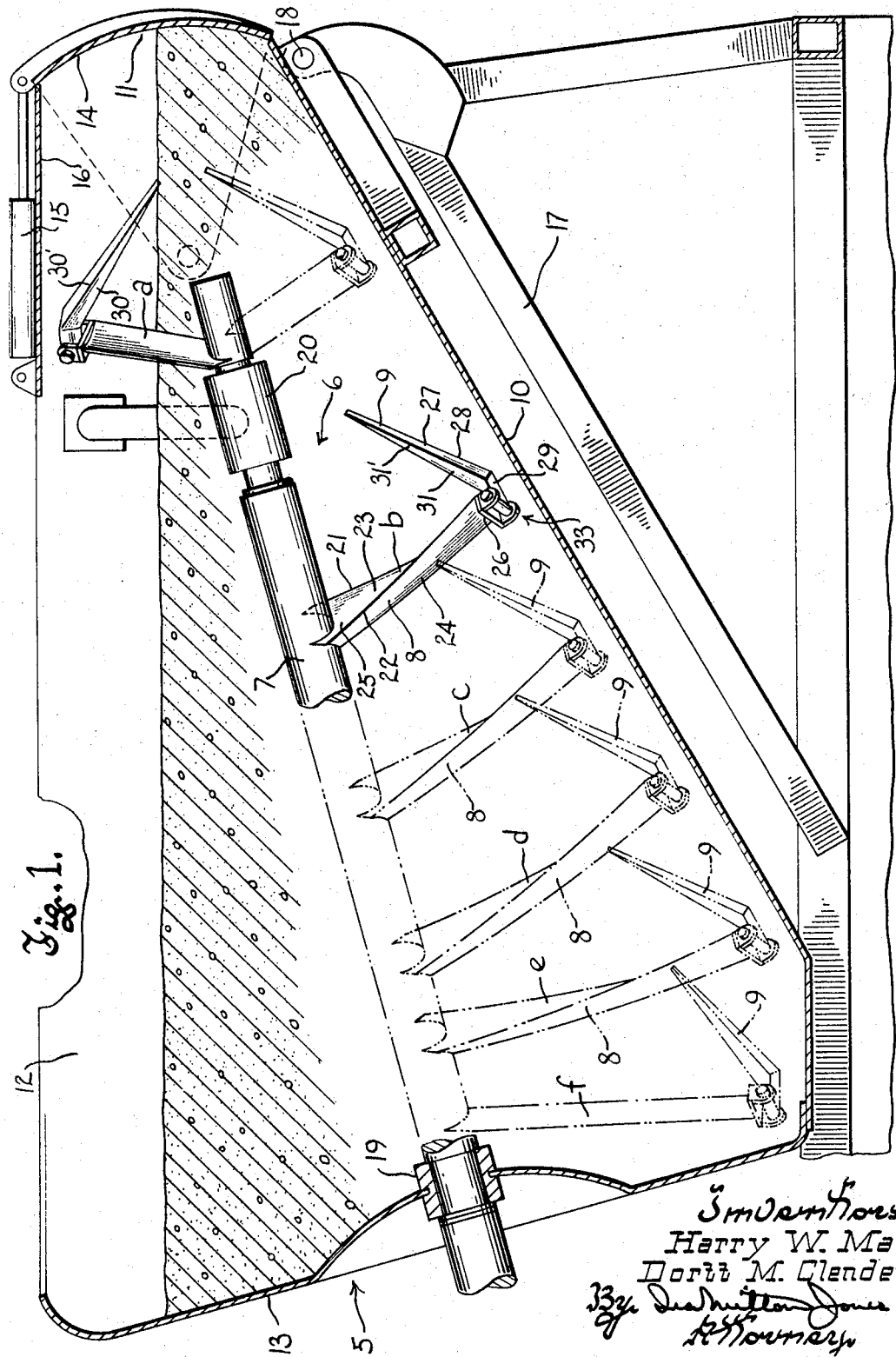
FIGURE 1 is a longitudinal sectional view of a vehicle dump body incorporating an agitator of this invention, the movable blade elements of the agitator being shown in their mixing positions.

FIGURE 6 is a perspective view of one of the blade assemblies of the agitator, showing the fixed blade element as viewed from the shaft or root end thereof and the movable blade element in its wiping position; and FIGURE 7 is a more or less diagrammatic plan view of one of the fixed blade elements of the agitator, with its cross section at several points along its length indicated in construction lines.

Referring now more particularly to the accompanying drawings, the numeral 5 designates generally a vessel for concrete and similar viscous materials in which is rotatably mounted an agitator 6 of this invention, said agitator comprising generally a shaft 7, a plurality of arm-like fixed blade elements 8 that project substantialy radially from the shaft at intervals along its length, and a movable blade element or flipper 9 hingedly connected to the tip portion of each fixed blade element.

In this instance the vessel 5 is illustrated as a vehicle dump body which is adapted to be mounted on the chassis of a motor truck, trailer, railroad car or the like, and which is tiltable between a transit position, shown in FIGURE 1, and a discharge position shown in FIGURE 2.

Along a substantial portion of its length the vessel or dump body 5 has a frustoconical bottom wall 10 which converges at an upward inclination toward a discharge outlet 11 at one end of the body, and the axis of the agitator shaft 7 coincides with the axis of said frustoconical wall portion. The frustoconical bottom wall 10 merges into upright side walls 12, and the end of the body opposite the discharge outet is closed by a wall 13 that is generally normal to the axis of the shaft 7.

In the transit position of the body, the discharge outlet 11 is normally closed by a gate 14 which is arranged to swing up and down and which can be actuated by a hydraulic cylinder 15. Along most of its length the body 5 has an open top, but it may have a short top wall or deck portion 16 near its discharge outlet to provide a mounting for the hydraulic cylinder 15 and to control the flow of material discharged from the outlet during dumping, as will be apparent from FIGURE 2.

The body is carried by a suitable frame structure 17 which also supports pivot means 18 about which the body is swingable between its transit and dumping positions and which has its axis on a transverse line directly beneath the discharge outlet. Since the frustoconical bottom wall 10 is inclined upwardly toward the discharge outlet, and the axis of the pivot means 18 is adjacent to that outlet, the discharge outlet will be at a substantially high elevation when the body is in its dumping position, as is desirable for efficient pouring of freshly mixed concrete.

In general the body 5 here shown and described is similar to that disclosed in Patent No. 2,880,977, issued Apr. 7, 1959, to Glenway Maxon, Jr., to which reference may be made for complete details.

The agitator shaft 7 is journaled in a bearing 19 carried by the end wall 13 and in another bearing 20 that is adjacent to the discharge outlet and supported from the side walls 12. It is power driven for rotation in both directions. In one direction of rotation the agitator effects mixing of material in the body, and in the opposite direction of rotation the fixed and movable blade elements 8 and 9 cooperate to propel material in the body lengthwise of the shaft toward the discharge outlet and to wipe the frustoconical wall 10 so as to loosen any material that may be adhered thereto.

The several fixed blade elements 8 are so secured to the shaft that adjacent fixed blade elements have their longitudinal center lines at different angles to one another, so that as the shaft rotates they enter and emerge from material in the body successively, thereby imposing a substantially uniform torsional load on the shaft all during the course of its revolution. This angular relationship of the fixed blade elements to one another is best seen in FIGURE 5, wherein the blade element nearest the discharge opening is shown uppermost and wherein the sequence of the blade elements, lettering them in alphabetical order from the discharge opening and proceeding clockwise around FIGURE 5, is a, e, d, b, f, c. Note that in FIGURES 1 and 2 the several blade elements shown in construction lines are illustrated as they would appear in the lowermost portions of their respective orbits and hence they are not shown in their actual angular relations to one another.

Each of the fixed blade elements 8 is of such length as to have its tip portion sweep an orbit that is close to the concave surface of the frustoconical bottom wall 10, and has a width which is preferably somewhat greater than the diameter of the shaft 7. Along its longitudinal centerline each fixed blade element is substantially thick, and it tapers in cross section to substantially sharp opposite longitudinal edges 21 and 22. Each fixed blade element can be formed from a pair of heavy sheet metal blade members 23 and 24, both of which are curved in cross section but one of which, designated 24, is bent to a smaller radius than the other. The two blade members 23 and 24, which can be considered as face and back members respectively, are welded together along their adjacent longitudinal edges, with the concave surface of the more sharply bent back blade member 24 opposing the convex surface of the face blade member 23. This substantially triangular cross sectional configuration and construction of the fixed blade elements corresponds generally to what is disclosed in the above mentioned Janke Patent No. 3,133,728, to which reference may be made for further details.

However, most of the fixed blade elements 8 in the agitator of the present invention differ from those disclosed in the Janke patent in having a substantial twist along their lengths. Each twisted blade element is so secured to the shaft 7 as to have a substantial pitch or inclination to the shaft axis in one direction at its root portion 25, but, by reason of its substantial twist, it has an opposite pitch at its tip portion 26. All of the twisted blade elements are of course so secured to the shaft as to have their root portions pitched in the same direction.

When the agitator of this invention rotates in the direction to effect mixing, the twisted fixed blade elements 8 produce more or less toroidal zones of agitation of material in the body whereby a very thorough and efficient mixing action is achieved. Specifically, the root portion 25 of each twisted fixed blade element propels material in the direction toward the discharge opening, while its tip portion 26 propels the material in the opposite direction.

During dumping, the agitator is rotated in the opposite or discharge direction, and the tip portions 26 of the twisted fixed blade elements then, by reason of their pitch, propel material along the frustoconical bottom wall and toward the discharge opening. At such times the root portions of the fixed blade elements tend to move material away from the discharge opening, but this has been found actually to be advantageous in affording smooth discharge because it prevents the upper portion of the body contents from overrunning the lower material and rushing through the discharge outlet 11 in a sudden burst.

The two fixed blade elements a and f nearest the respective ends of the shaft 7 are not twisted along their lengths, although they are similar in cross section to the twisted fixed blade elements. The fixed blade element *f* nearest the end wall 13 is fixed to the shaft at an inclination thereto such that all portions of it propel material in the body away from said end wall when the agitator rotates in the mixing direction and propel material toward that end wall during discharge. Such operation of the blade element *f* tends to insure against "piling up" of material in the closed end of the body during transit mixing, which would result in material being spilled over the end and side walls. The tendency of the blade element *f* to move material away from the discharge outlet during dumping does not actually interfere with discharge from the closed end portion of the body because gravity can be relied upon to pull material away from the end wall 13, and in any event the movable blade element or flipper 9 on said fixed blade element *f* tends to wipe the bottom wall clean and propel material toward the discharge outlet, as explained hereinafter.

The fixed blade element *a* nearest the discharge outlet 11 is likewise untwisted and has a cross section similar to the twisted blade elements, but it is so affixed to the shaft that all portions of it are pitched in the direction to propel material away from the discharge outlet during mixing and toward the outlet during discharge. Hence the fixed blade element *a* functions in a manner to prevent "pile up" of material at the discharge end of the body during mixing and to facilitate and expedite flow of material through the discharge outlet during dumping.

To the tip portion of each fixed blade element 8 there is hingedly connected an elongated movable blade element or flipper 9 which projects generally in the direction toward the discharge outlet 11. Each flipper, as viewed in plan, tapers from its hinged end to a substantially narrow tip. In cross section each flipper is triangular, with a wide, flat bottom surface 27 and narrower oppositely inclined upper surfaces 30 and 31, but the flipper is thickest at its hinged end and tapers to flatness at its tip.

The surface 27 of the flipper which is remote from the shaft 7, and which is herein designated its bottom surface (having regard to its attitude in the lower portion of its orbit), is defined by a heavy sheet metal plate 28 that is substantially flat along most of its length but is bent to an upward inclination, as at 29, at its hinged end portion. The two upper surfaces 30 and 31 of the flipper can be defined by another sheet metal member 32 that is generally similar in shape to the member 28 but is bent along its length to dispose the surfaces near its opposite longitudinal edge portions at opposite inclinations to one another. The two members 28 and 32 comprising the body of the movable blade element 9 are welded or otherwise secured together with their respective longitudinal edges adjacent to one another, and with the concave surface of the bent blade member 32 facing the flat blade member 28.

The line along which the blade member 32 is bent is preferably located somewhat to one side of the longitudinal centerline thereof, so that one upper surface 30 of the flipper is narrower than its other upper surface 31 and is more steeply inclined to the plane of the bottom surface 27. Said narrower upper surface 30 extends along the longitudinal edge 30′ of the flipper which leads when the agitator rotates in its discharging direction and which trails when the agitator rotates in its mixing direction.

The swinging connection between each flipper 9 and its fixed blade element 8 is provided by a suitable hinge 33, which can comprise a pin 34 that is secured to the flipper and has its opposite end portions rotatably received in apertured ears 35 that are fixed on the tip portion of the fixed blade element. As shown, the hinge pin 34 extends lengthwise along and is welded to the upper edge of the upwardly bent portion 29 of the lower flipper plate 28. Cooperating with this upwardly bent portion of the flipper to secure the hinge pin thereto is a channel-shaped member 36 which has its legs projecting away from the tip of the flipper and toward the upwardly inclined portion 29, to which their outer ends are welded. The hinge pin is embraced by and welded to the upper edges of said channel-shaped member 36 and the member 29.

Attention is directed to the fact that the axis of the hinge pin 34 is inclined to the plane of the bottom surface of the movable blade element, passing closer to that plane along the longitudinal edge 30′ of the flipper. Furthermore, the axis of the hinge pin is also inclined away from the tip of the flipper at its edge 30′ due to the pitch at the outer end of the fixed blade from which the hinge pin is supported. It is also to be noted that the longitudinal edge 30′ of the flipper along which its narrower upper surface portion 30 extends is so inclined with respect to a plane including the shaft axis and intersecting the tip of the flipper as to converge toward said plane from the hinged end of the flipper, which is to say that said surface portion 30 of the flipper is pitched toward the discharge outlet 11 when the agitator rotates in its discharging direction.

As the agitator rotates in its discharing direction, with the edge 30′ of the flipper leading, the reaction of material in the body upon the inclined upper surface portion 30 on the flipper tends to swing the latter away from the shaft 7 and to maintain it in its wiping position. In that position of the flipper its longitudinal edge 30′ is in contact all along its length with the concave inner surface of the frustoconical bottom body wall 10, throughout substantially the entire lower half of the orbit of the flipper, and the flipper thus effects a wiping of the body wall by which any clinging material is dislodged therefrom. At the same time that the flipper wipes the body wall, its narrower upper surface portion 30 effects propulsion of material adjacent to the wall in the direction of the discharge outlet, owing to the above mentioned pitch or inclination of said surface portion. The other or trailing longitudinal edge 31′ is spaced a substantial distance from the concave inner surface of the body wall 10 in this wiping or discharging position of the flipper, so that the bottom 27 of the flipper recedes from the body wall toward the trailing edge 31′.

When the agitator rotates in its mixing direction, the reaction of material in the body against the inclined bottom surface 27 of the flipper tends to swing the flipper about the axis of the hinge 33 in the direction toward the shaft 7 and the fixed blade carrying the flipper, so that each flipper assumes a mixing position (illustrated in FIGURE 1) in which it cooperates with its fixed blade element 8 in effecting agitation of material in a substantially large zone in the body. When the flipper is in its mixing position, its bottom and both the upper surfaces are disposed at acute angles to the path of relative motion of the flipper through the material in the body, and their attitudes are responsible for the generation of a certain amount of turbulence in the material around the trailing edge portion of the flipper by which good mixing action is assured.

When the movable blade element or flipper is in and near its wiping position, but the agitator is rotating in its mixing direction, the wider upper surface 31 of the flipper, which is then its leading upper surface, is disposed almost parallel to the direction of relative motion of the flipper through the material, and hence that upper surface has little influence upon the angular position of the flipper about the axis of the hinge 33. But because the hinge axis is disposed at the same pitch angle as the outer end of the fixed blade 8 and in addition is inclined with respect to the plane of the bottom surface 27 of the flipper, said wider upper surface portion 31 receives an increasing reaction force from material in the body as the flipper swings closer and closer to the shaft, while the bottom surface 27 receives a correspondingly decreasing reaction force. At some point in such swinging motion the reaction force on the wider leading upper surface 31 comes into equilibrium with that on the bottom surface 27 of the flipper, and at that point the flipper tends to maintain its mixing attitude.

In the upper portion of its orbit, when the flipper is out of engagement with material in the body, the flipper can of course swing freely, and its tip tends to drop toward the shaft 7. The hinge 33, can, if desired, provide for limited swinging of the flipper, by means of any suitable type of stop, to prevent it from dropping excessively as it traverses this portion of its orbit; and suitable stops can also be provided to limit swinging of the flipper away from the shaft to prevent its tip from damaging the side walls of the body as it reenters the material therein during rotation of the agitator in either the mixing or discharging directions.

From the foregoing description taken together with the accompanying drawings it will be apparent that this invention provides an agitator for concrete and similar viscous materials that is particularly well suited for vehicle dump bodies and which is capable both of effecting a very thorough and rapid mixing action and of facilitating smooth and rapid discharge of the contents of a dump body in which it is installed.

What is claimed as our invention is:

1. An agitator for a vessel having wall portions that define a concave surface which is concentric to an axis, said agitator comprising:
   (A) a rotatable shaft in the vessel having its axis substantially coincident with that of said concave surface;
   (B) an arm fixed to said shaft and projecting substantially radially therefrom;
   (C) an elongated blade member extending from an outer portion of the arm generally lengthwise of the shaft axis, and having a longitudinal edge that is adapted for wiping engagement with said concave surface;
   (D) hinge means connecting said outer end portion of the arm with the adjacent end of the blade member to mount the latter on the arm for rotation therewith and for swinging motion relative thereto between a wiping position in which the blade member is extended and its said longitudinal edge is contiguous along its length with said concave surface, and an agitating position in which the free end of the blade member is nearer the shaft axis;
   (E) means on the blade member defining a surface that extends lengthwise of its said one longitudinal edge for reacting against material in the vessel upon rotation of the shaft in the direction of said longitudinal edge to urge the blade member to its wiping position;
   (F) means on the blade member defining second surface for reacting against material in the vessel upon rotation of the shaft in the opposite direction to urge the blade member toward its mixing position;
   (G) and surface means on the blade member for creating turbulence in material in the vessel in consequence of rotation of the shaft in said opposite direction.

2. An agitator for a vessel having wall portions that define a concave surface which is concentric to an axis, said agitator comprising:
   (A) a rotatable shaft mounted in the vessel with its axis substantially coincident with that of said concave surface;
   (B) an arm fixed to said shaft and projecting substantially radially therefrom;
   (C) means on an outer end portion of the arm providing a hinge having its axis generally transverse to the arm and to the shaft; and
   (D) an elongated blade member having opposite longitudinal edges and connected at one end to said hinge for rotation with the arm and for swinging motion relative to the arm about said hinge axis between an extended position in which the blade member is disposed generally lengthwise of the shaft to have one of its longitudinal edges in wiping contact along its length with said concave surface and its other longitudinal edge spaced from said surface, and an agitating position in which the blade member is retracted toward the arm, said blade member having
      (1) a top surface portion extending lengthwise along said one longitudinal edge and laterally therefrom, and generally inclined with respect to the hinge axis, and against which material in the vessel reacts when the shaft is rotated in the direction of said one edge to urge the blade member to its extended wiping position,
      (2) a bottom surface portion extending laterally from one of said longitudinal edges to the other and against which material in the vessel reacts when the shaft is rotated in the opposite direction to urge the blade member toward its retracted position, and
      (3) a third surface portion disposed generally in a plane intersecting said top and bottom surfaces and which produces turbulence in material in the vessel when the shaft is rotated in said opposite direction.

3. The agitator of claim 2 further characterized by:
said top surface portion and one longitudinal edge of the blade member being generally inclined to a plane containing the shaft axis and intersecting the free end portion of the extended blade member, whereby the blade member acts upon material in the vessel and moves it away from the arm when the shaft is rotated in said first designated direction.

4. The agitator of claim 3, further characterized by:
said third surface portion being inclined with respect to the bottom surface portion in the direction opposite to the inclination of said top surface portion and extending laterally from said other longitudinal edge to said top surface portion.

5. An agitator of the character described, comprising:
   (A) a rotatable shaft;
   (B) a blade fixed to the shaft and projecting substantially radially therefrom, said blade comprising
      (1) a first elongated blade element having lengthwise extending leading and trailing edges and which is twisted along its length;
      (2) a second elongated blade element lengthwise overlying the first and having lengthwise extending leading and trailing edges respectively adjacent to those on the first element, said second element being curved across its width and being secured to the first blade element to stiffen the same, with the concave surface on the second blade element facing the first blade element so that the two blade elements cooperate to define a blade having substantial thickness intermediate its leading and trailing edges and which tapers to substantially sharp leading and trailing edges; and
      (3) the leading and trailing edges of the blade near its root being disposed generally on a line which is inclined in one direction to the shaft axis, and the leading and trailing edges of the blade near its tip being disposed on another line which is inclined in the opposite direction to the shaft axis, so that upon rotation of the shaft the root portion of the blade tends to displace material in one axial direction while the tip portion tends to displace material in the opposite axial direction.

6. An agitator for a vessel having wall portions that define a concave surface which is concentric to an axis, said agitator comprising:
   (A) a rotatable shaft having its axis substantially coinciding with that of said concave surface;
   (B) an elongated fixed blade element having opposite longitudinal edges and which is twisted along its length, said fixed blade element being secured to said shaft with its longitudinal edges extending substantially radially from the shaft and with the fixed blade element in such an attitude that a transverse line through said edges near the shaft is inclined in one direction relative to the shaft axis and a similar line near the tip of the fixed blade element is inclined in the opposite direction relative to the shaft axis, so that upon rotation of the shaft in one direction the root portion of the fixed blade element tends to displace material in the vessel in one direction lengthwise of the shaft and the tip portion tends to displace such material in the opposite direction;

(C) means on the outer end of the fixed blade member providing a hinge having its axis generally parallel to said last named line; and (D) an elongated movable blade member having a longutinal edge adapted for wiping engagement with said concave surface, said movable blade member having one end connected to said hinge to be swingable out of wiping engagement with said concave surface toward the fixed blade member to an agitating position, said movable blade member also having (1) a surface portion facing toward its longitudinal edge and against which material in the vessel reacts when the shaft rotates in one direction to hold the movable blade member in its wiping position, (2) another surface portion facing away from said longitudinal edge and against which material in the vessel reacts upon rotation of the shaft in the opposite direction to hold the movable blade member in its agitating position, and (3) means for creating turbulence in material in the vessel in consequence of rotation of the shaft in said opposite direction.

7. In combination with a vessel having bottom wall portions that define a concave surface which is concentric to an axis, an agitator shaft mounted for rotation in the vessel with its axis of rotation coincident with that of said concave surface, and an arm fixed to the shaft and projecting substantially radially therefrom:

(A) a blade on the outer end of the arm constrained to rotate therewith and projecting in one axial direction from the arm;

(B) means defining a hinge connection between the blade and the arm providing for swinging motion of the blade away from the arm to a wiping position at which an edge portion of the blade is adapted to wipingly engage said concave surface during rotation of the shaft in one direction, and for motion toward the arm to a mixing position at which the blade is adapted to agitate and mix material in the vessel at zones between said concave surface and the shaft during rotation of the shaft in the opposite direction;

(C) first deflecting means on the blade upon which material in the vessel can act to swing the blade toward its wiping position during rotation of the shaft in said one direction;

(D) and second deflecting means on the blade upon which material in the vessel can act to swing the blade toward its mixing position during rotation of the shaft in said opposite direction.

8. In combination with a vessel having bottom wall portions that define a concave surface which is concentric to an axis, an agitator shaft mounted for rotation in the vessel with its axis of rotation coincident with that of said concave surface, and an arm fixed to the shaft and projecting substantially radially therefrom:

(A) a blade hingedly connected at one end to the outer end of the arm to rotate therewith and to swing to positions either toward or away from the arm substantially on a plane containing the shaft axis;

(B) means on the blade having surfaces against which material in the vessel can act to swing the blade to said positions thereof depending upon the direction in which the shaft is rotated;

(C) means on the blade adapted to have wiping engagment with said concave surface when the shaft is rotated in the direction to cause the blade to occupy said position away from the arm;

(D) and means on the blade for agitating material in the vessel when the shaft is rotated in the direction to cause the blade to occupy said position toward the arm.

References Cited by the Examiner

UNITED STATES PATENTS

| 307,471 | 11/1884 | Knight | 259—179 |
| 3,133,728 | 5/1964 | Janke | 259—178 |

FOREIGN PATENTS

| 19,532 | 1908 | Great Britain. |

WALTER A. SCHEEL, *Primary Examiner.*

R. W. JENKINS, *Assistant Examiner.*